(12) United States Patent
Seo et al.

(10) Patent No.: US 10,761,800 B2
(45) Date of Patent: Sep. 1, 2020

(54) OUTDOOR DISPLAY APPARATUS

(71) Applicant: SAMSUNG ELECTRONICS CO., LTD., Suwon-si (KR)

(72) Inventors: Jong Pil Seo, Suwon-si (KR); Nam Gi Lee, Hwaseong-si (KR); Jeong Roh Lee, Hwaseong-si (KR); Woo Hyeon Jo, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 16/042,562

(22) Filed: Jul. 23, 2018

(65) Prior Publication Data
US 2019/0026062 A1  Jan. 24, 2019

Related U.S. Application Data

(60) Provisional application No. 62/535,331, filed on Jul. 21, 2017.

(30) Foreign Application Priority Data

Nov. 9, 2017 (KR) .................. 10-2017-0148554

(51) Int. Cl.
| | |
|---|---|
| *G09G 5/00* | (2006.01) |
| *G06F 3/14* | (2006.01) |
| *G06F 3/147* | (2006.01) |
| *G09F 9/30* | (2006.01) |
| *G09F 15/00* | (2006.01) |
| *G09F 27/00* | (2006.01) |

(52) U.S. Cl.
CPC ............ *G06F 3/1446* (2013.01); *G06F 3/147* (2013.01); *G09F 9/30* (2013.01); *G09F 15/005* (2013.01); *G09F 15/0006* (2013.01); *G09F 15/0037* (2013.01); *G09F 15/0068* (2013.01); *G09F 27/00* (2013.01)

(58) Field of Classification Search
CPC ........... G06F 3/14; G06F 3/147; G06F 3/1407
See application file for complete search history.

(56) References Cited

U.S. PATENT DOCUMENTS

| | | | | |
|---|---|---|---|---|
| 10,089,907 | B2* | 10/2018 | Thul | ..................... G09F 9/3026 |
| 10,180,591 | B2* | 1/2019 | Lee | ................... H05K 7/20972 |
| 2017/0123749 | A1 | 5/2017 | Hall | |
| 2018/0074772 | A1* | 3/2018 | Thul | ....................... H04B 1/38 |
| 2018/0075786 | A1* | 3/2018 | Thul | ..................... G09F 9/3026 |

* cited by examiner

Primary Examiner — Vijay Shankar
(74) Attorney, Agent, or Firm — Sughrue Mion, PLLC

(57) ABSTRACT

Provided is an outdoor apparatus includes including a display unit configured to accommodate at least one display module to be mounted therein; and a stand configured to accommodate at least one device, which is connectable to the at least one display module, to be mounted therein, the display unit being configured to be rotatably installed at an upper side of the stand, wherein the stand includes a base part configured to be installed on a floor, a mount part provided on the upper side of the stand, and an accommodating part provided between the base part and the mount part and configured to accommodate the at least one device, and wherein the mount part includes a wire through hole configured to allow a wire connected to the at least one display module to pass therethrough, and a waterproof structure configured to prevent an inflow of water through the wire through hole.

18 Claims, 15 Drawing Sheets

OUTDOOR DISPLAY APPARATUS

CROSS-REFERENCE TO RELATED APPLICATION(S)

This application is based on and claims priority under 35 U.S.C. § 119 to U.S. Provisional Application No. 62/535,331, filed on Jul. 21, 2017, in the United States Patent and Trademark Office, and Korean Patent Application No. 10-2017-0148554, filed on Nov. 9, 2017, in the Korean Intellectual Property Office, the disclosures of which are incorporated by reference herein in their entireties.

BACKGROUND

1. Field

The present disclosure relates to an outdoor display apparatus for use in an outdoor space.

2. Description of Related Art

An outdoor display apparatus is a display apparatus that may be used in an outdoor space, and is designed in consideration of an environment exposed to rain, snow, sunlight, etc.

Such an outdoor display apparatus may include a plurality of display modules disposed in a housing forming an exterior of the outdoor display apparatus, as well as various devices for transmitting sound and image signals to the display modules.

Since the housing of the outdoor display apparatus is formed to be large enough to accommodate the plurality of display modules and the various devices, the size of the outdoor display apparatus is generally quite large.

Therefore, it is difficult to transport and install such large-sized outdoor display apparatuses, without the use of additional equipment such as a crane.

SUMMARY

Provided is an outdoor display apparatus which can be carried and installed easily.

In accordance with an aspect of the disclosure, an outdoor display apparatus includes: a display unit configured to accommodate at least one display module to be mounted therein; and a stand configured to accommodate at least one device, which is connectable to the at least one display module, to be mounted therein, the display unit being configured to be rotatably installed at an upper side of the stand, wherein the stand includes a base part configured to be installed on a floor, a mount part provided on the upper side of the stand, and an accommodating part provided between the base part and the mount part and configured to accommodate the at least one device, and wherein the mount part includes a wire through hole configured to allow a wire connected to the at least one display module to pass therethrough, and a waterproof structure configured to prevent an inflow of water through the wire through hole.

The waterproof structure may include a shaft pipe installed in the wire through hole, a cap configured to cover an upper end of the shaft pipe, and a sealing member configured to form a seal between the upper end of the shaft pipe and the cap.

The sealing member may include a sealing portion having a circular ring shape which corresponds to the shaft pipe, and a plurality of wire installation grooves recessed on an upper surface of the sealing portion and configured to accommodate the wire.

The sealing member may further include stopper portions extending from the sealing portion and configured to close unused wire installation grooves of the plurality of wire installation grooves.

The shaft pipe may include a plurality of support ribs protruding from the upper end of the shaft pipe and configured to support the sealing portion, the plurality of support ribs may include at least one pair of support ribs, support ribs of each of the at least pair of support ribs being spaced apart from each other in a radial direction, and the sealing portion may be inserted between the support ribs of each of the at least one pair of support ribs.

The shaft pipe may include a plurality of latching protrusions, the cap may include a cap portion configured to cover the upper end of the shaft pipe and a plurality of latching portions extending downward from the cap portion, and the plurality of the latching portions include latching holes configured to latch the plurality of the latching protrusions.

The display unit may have a rectangular shape and may include a frame configured to accommodate the at least one display module and a rear cover configured to cover a rear surface of the display module.

The frame may include a frame part having the rectangular shape and a support part extending vertically to partition the inside of the frame part and configured to support the at least one display module.

The mount part may have an oval shape, and the display unit may be configured to be rotatably mounted on the mount part through the shaft pipe.

The mount part may include fastening holes configured to accommodate fasteners to install the display unit thereon, and the fastening holes may have an arc shape extending in a circumferential direction about the wire through hole.

The accommodating part may include an opening provided at one side of the accommodating part and a cover plate configured to open and close the opening.

The opening may include upper and lower openings provided at upper and lower portions of the accommodating part, and the cover plate may include an upper cover plate configured to open and close the upper opening and a lower cover plate configured to open and close the lower opening.

The lower cover plate may include a suction guide configured to guide an inflow of air, and the upper cover plate may include a discharge guide configured to guide a discharge of air.

The outdoor display apparatus may further include a cover configured to be coupled to a front side of the display unit to cover at least a front surface of the display module.

In accordance with another aspect of the disclosure, an outdoor display apparatus includes: a display unit configured to accommodate a plurality of display modules to be mounted therein; and a stand configured to accommodate at least one device, which is connectable to the plurality of display modules, to be mounted therein, wherein the display unit is configured to be fixed to the stand such that the display unit may be rotated within a predetermined angle with respect to the stand.

The stand may include a shaft pipe having a hollow pipe shape, the display unit may be configured to be rotatably installed on the shaft pipe, and a wire, connecting at least one of the plurality of the display modules and the at least one device accommodated in the stand, may pass through the shaft pipe.

The stand may include a mount part including an oval plate, the display unit may be configured to be installed on an upper side of the stand, and the shaft pipe may be disposed at a center of the mount part.

The mount part may include a plurality of fastening holes through which the display unit is fixed to the mount part by at least one fastening member, and the plurality of the fastening holes may have an arc shape extending in a circumferential direction about the shaft pipe.

The outdoor display apparatus may further include: a cap configured to cover an upper end of the shaft pipe, and a sealing member configured to form a seal between the upper end of the shaft pipe and the cap.

In accordance with another aspect of the disclosure, a display apparatus includes: a display housing configured to accommodate at least one display module to be provided therein; and a stand configured to support the display housing through a rotatable connection, wherein the stand includes a base part provided at a lower end of the stand, a mount part provided at an upper end of the stand opposite to the lower end, and an accommodating part provided in a middle portion of the stand between the lower end and the upper end, wherein the base part is configured to be provided on a floor, and the accommodating part is a hollow portion configured to accommodate at least one electronic device, and wherein the rotatable connection is formed between the display housing and the mount part.

The mount part may include a wire through hole configured to allow a wire connecting the at least one display module to the at least one electronic device to pass therethrough.

The mount part may further include a waterproof structure configured to prevent water from passing through the wire through hole.

The waterproof structure may include a shaft pipe provided in the wire through hole, a cap configured to cover an upper end of the shaft pipe, and a sealing member configured to form a seal between the upper end of the shaft pipe and the cap.

The base part may be formed as a rectangular plate having a plurality of fastening holes configured to accommodate fasteners to attach the base part on the floor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
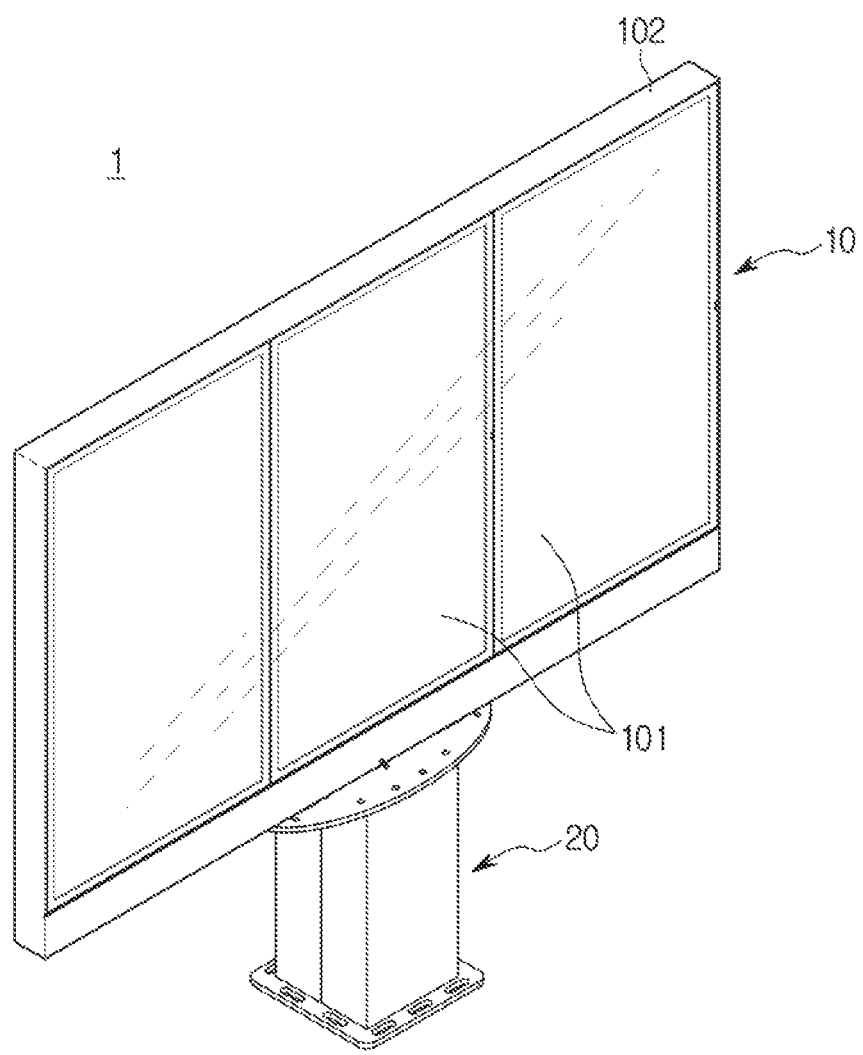
FIG. 1 is a front perspective view illustrating an outdoor display apparatus according to an embodiment.

In the following description, like reference numerals or symbols refer to like elements throughout the present specification.

The terms used in the present specification are used to describe the embodiments of the present disclosure. Accordingly, it should be apparent to those skilled in the art that the following description of embodiments is provided for illustration purposes only and not for the purpose of limiting the disclosure as defined by the appended claims and their equivalents. It is to be understood that the singular forms "a," "an," and "the" are intended to include the plural forms as well, unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more associated listed items.

In the following description, the terms "front end," "rear end," "upper portion," "lower portion," "upper end," and "lower end" are defined based on the drawings, and do not intend to limit the shapes and locations of individual components.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, an outdoor display apparatus according to an embodiment will be described in detail with reference to the accompanying drawings.

Figure 2:
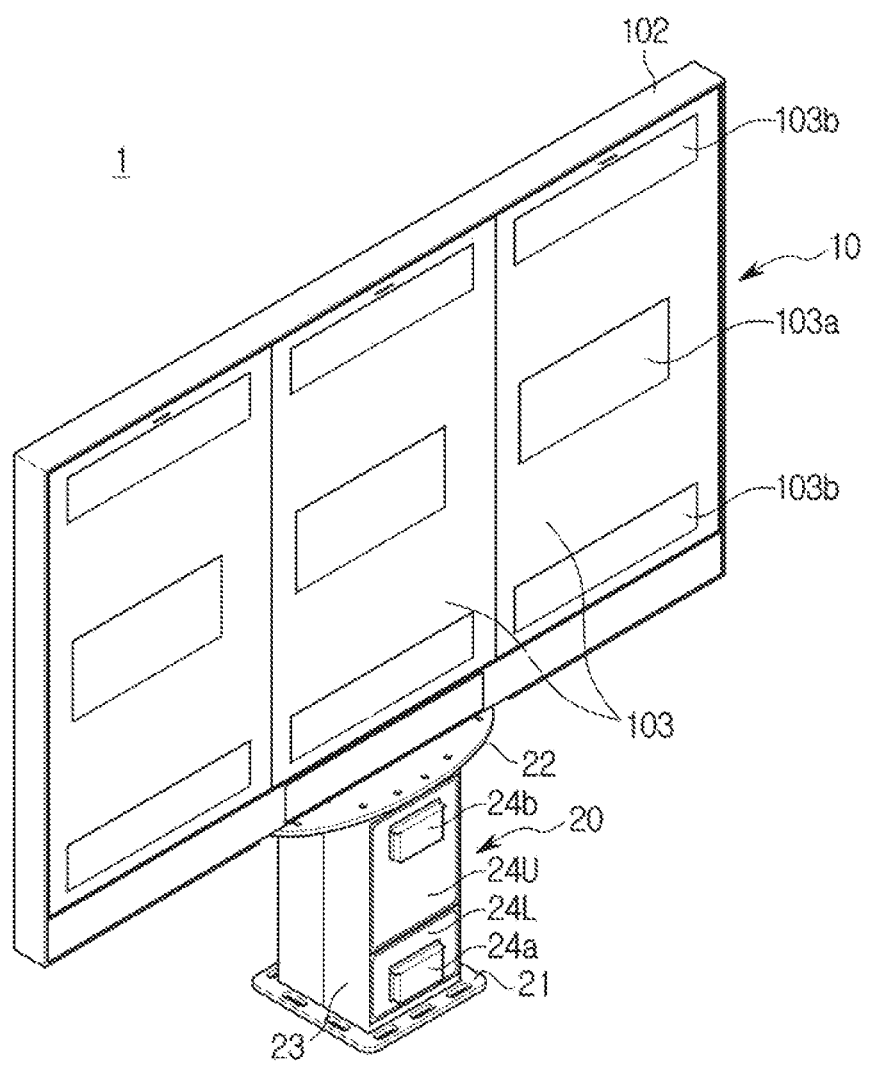
FIG. 2 is a rear perspective view illustrating the outdoor display apparatus according to an embodiment.
Figure 3:
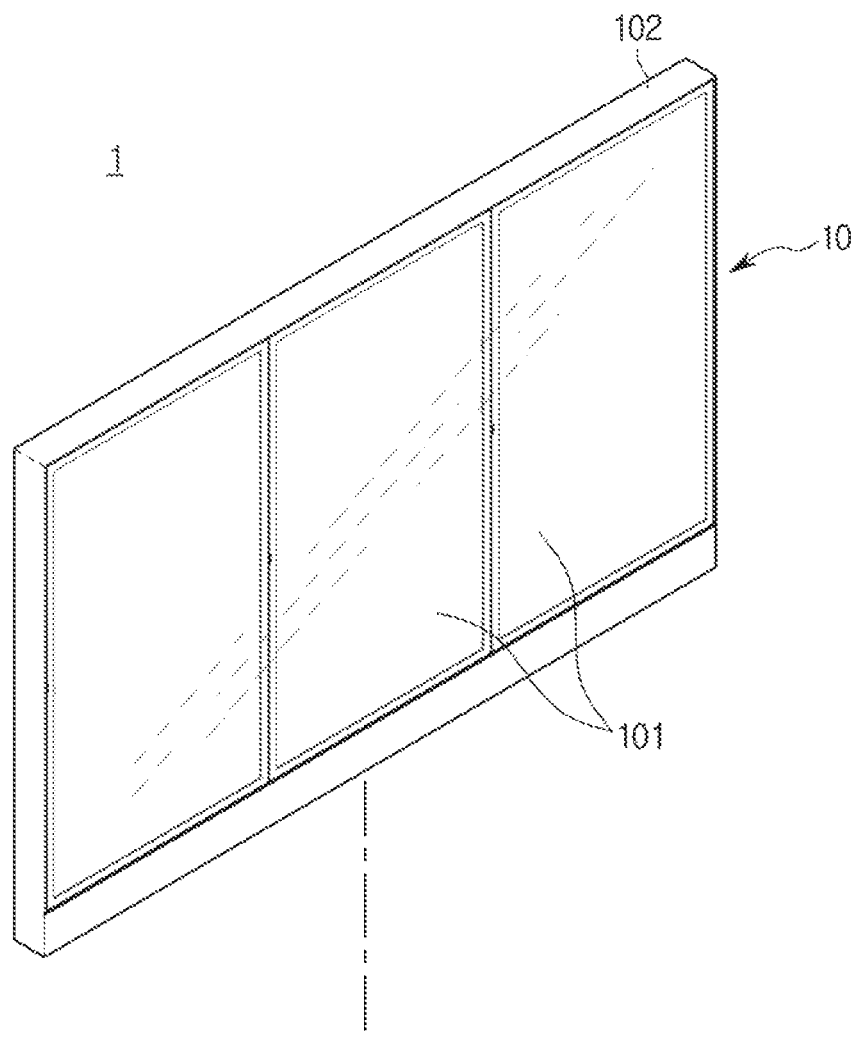
FIG. 3 is an exploded perspective view illustrating a coupling of a display unit and a stand in the outdoor display apparatus according to an embodiment.

Referring to FIGS. 1, 2, and 3, an outdoor display apparatus 1 is a display apparatus mainly used in an outdoor space, and is designed in consideration of being used in an outdoor environment exposed to rain, snow, sunlight and the like.

Hereinafter, the outdoor display apparatus 1 will be described as being installed in an outdoor space. However, this is intended to explain a use environment in which the outdoor display apparatus 1 is mainly used. However, the outdoor display apparatus 1 is not limited to use in an outdoor space, but may also be used in an indoor space.

Referring to FIGS. 1, 2, and 3, the outdoor display apparatus 1 includes a display unit (display housing) 10 for housing at least one display module one which a screen is displayed, and a stand 20 mounted on a floor of the outdoor space and coupled with the display unit 10 on an upper side thereof. Therefore, the display unit 10 may be installed in the outdoor space at a distance away from the floor through the stand 20. The stand 20 may be manufactured and packaged separately from the display unit 10.

The display unit 10 may include three display modules 101 on which screens are displayed, a frame 102 for accommodating and supporting the display modules 101, and three covers 103 for covering rear surfaces of the three display modules 101.

In configurations for forming the outdoor display apparatus 1, the frame 102 may be packaged in one box, and the stand 20 and the rear cover 103, which may be manufactured separately from the frame 102, may be packaged in another box. Each of the three display modules 101 may be packaged in separate boxes. Thus, the configurations forming the outdoor display apparatus 1 may be packaged into approximately five boxes. Of course, this is merely an example, and elements may be packaged individually or together. For example, the frame 102 and the rear cover 103 may be packaged in one box, and the stand 20 may be packaged in another box.

As such, because the outdoor display apparatus 1 may be packaged in several boxes, which are each smaller in size and weight than the outdoor display apparatus as a whole, each of the boxes can be carried by manpower. Therefore, since the outdoor display apparatus 1 can be carried and installed by manpower (e.g., instead of a crane), the transportation and the installation of the outdoor display apparatus 1 become easier.

Figure 4:
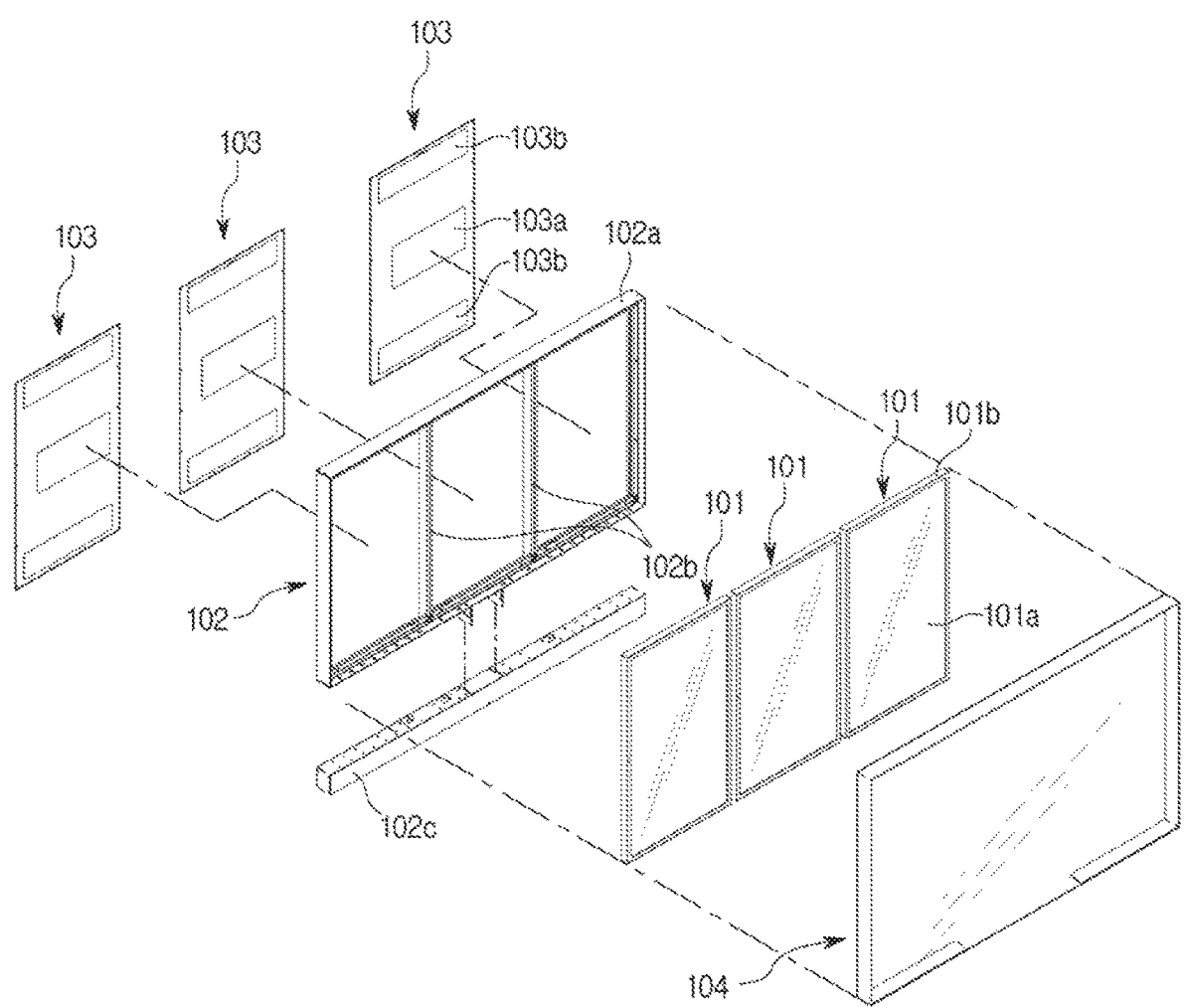
FIG. 4 is a front exploded perspective view illustrating the display unit according to an embodiment.

Referring to FIG. 4, the display unit 10 includes a decorative cover 104 coupled to a front side of the display unit 10. The decorative cover 104 is formed of a nonconductive material such as resin or rubber and is coupled to cover the front side of the display modules 101 and the four sides of the frame 102.

The decorative cover 104 is formed of a transparent or translucent material so that a screen displayed on the outdoor display apparatus 1 may be seen from the outside of the outdoor display apparatus 1. However, the present disclosure is not limited thereto. The decorative cover 104 may be formed of an opaque material, and an opening may be formed at a position corresponding to the screen of the display module 101 so that the screen is not covered. In addition, a portion of the decorative cover 104 corresponding to a portion where the screen is displayed may be formed as a transparent window made of a transparent material.

Alternatively, the decorative cover 104 may be manufactured in various colors. The decorative cover 104 may also be coupled to the display unit 10 to cover the joints of respective parts or fastening members, so that an appearance of the outdoor display apparatus 1 may be improved through the decorative cover 104.

In addition, the decorative cover 104 covers the front side of the display modules 101 to prevent water from flowing into the display modules 101 from the front side of the display modules 101.

In the example described above, the decorative cover 104 covers the front surfaces of the display modules 101 and the four sides of the display modules 101, but this is only an example.

The decorative cover 104 may be formed to cover the front surfaces of the display modules 101, and may be formed so as not to cover the remaining portion according to the design.

The display modules 101 are disposed vertically, and three of the display modules 101 are arranged in the left-right direction to form a rectangular shape. The three display modules 101 may operate in a multi-vision mode to display a single image together. Alternatively the three display modules 101 may display different images. The display module 101 may be a water-resistant or waterproof module in consideration of the fact that the outdoor display apparatus 1 may be used in the outdoor space.

Figure 6:
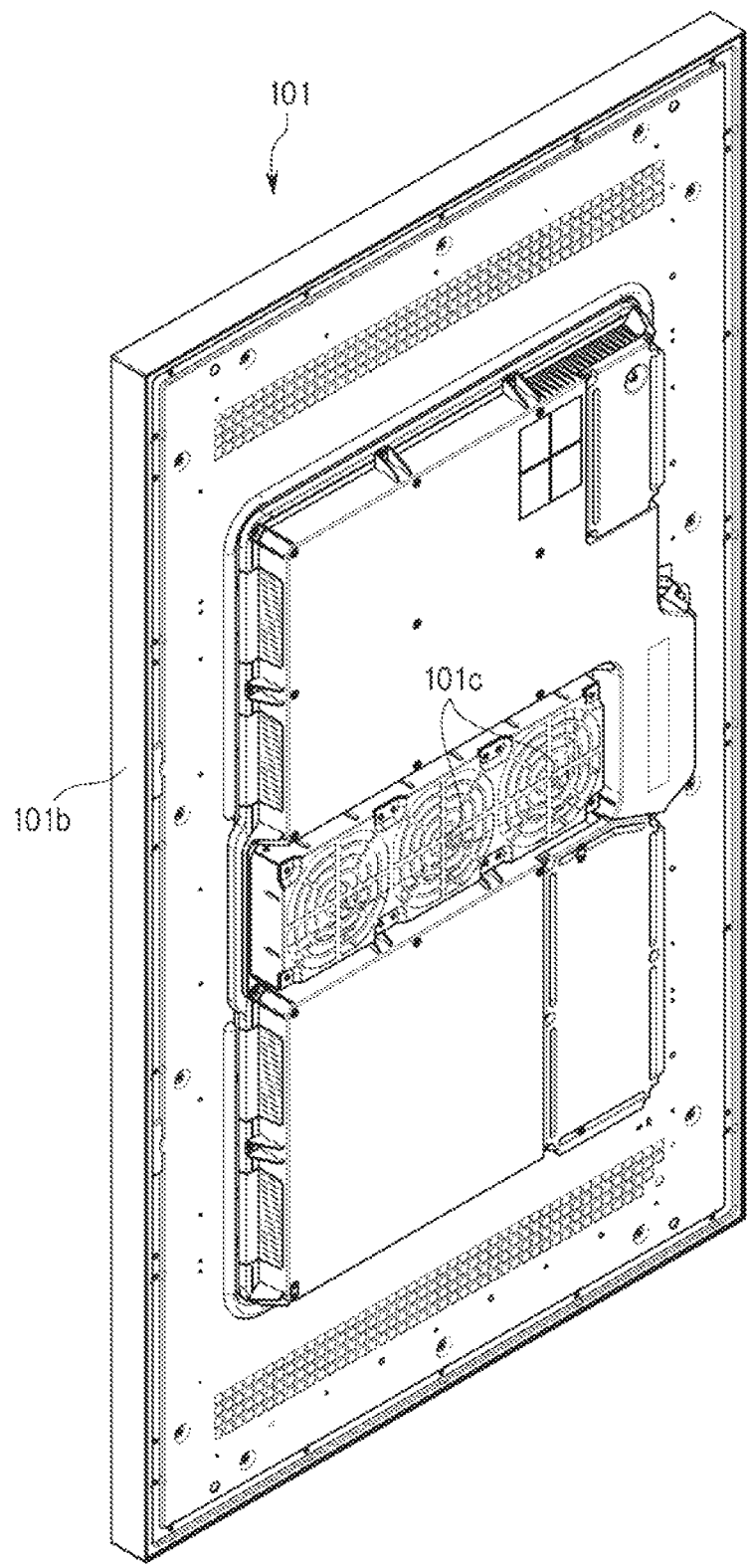
FIG. 6 is a rear perspective view illustrating a display module according to an embodiment.

Each of the display modules 101 includes a display panel 101a made of a liquid crystal panel, a backlight to supply light to the display panel 101a, and a chassis 101b to support the display panel 101a and the backlight. Also, as shown in FIG. 6, the display module 101 includes a blowing fan 101c installed at a rear center of the display module 101. The blowing fan 101c suctions outside air into the chassis 101b and then discharges the suctioned air to the outside so that heat generated in the inside of the display module 101 is radiated to the outside.

In the example described above, the display module 101 includes the display panel 101a including the liquid crystal panel, and the backlight. However, the display module 101 may be formed as an organic light emitting diode panel that does not require the backlight and thus has a slimmer profile.

Figure 7:
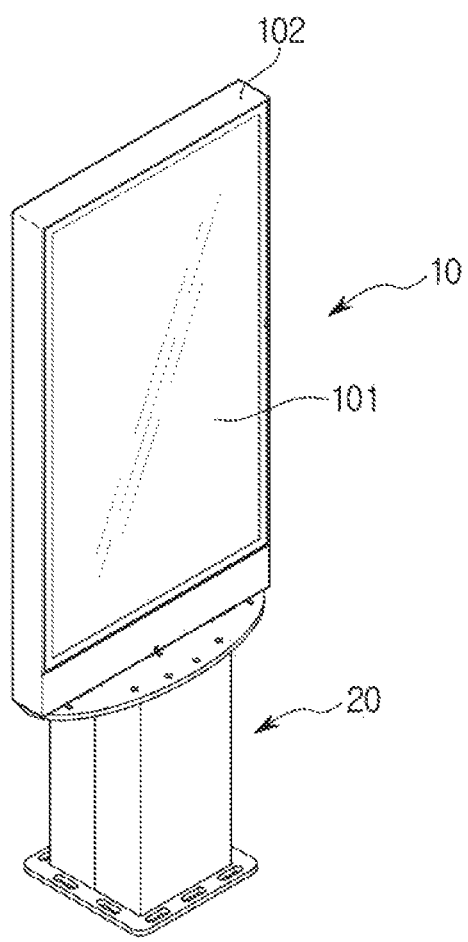
FIG. 7 is a perspective view illustrating an outdoor display apparatus including one display module according to another embodiment.
Figure 8:
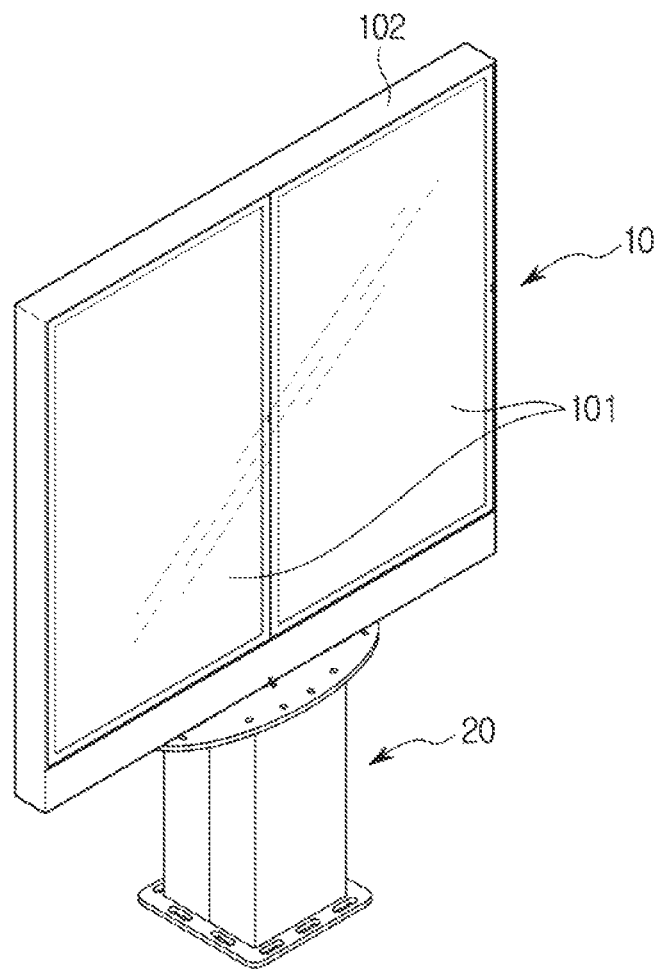
FIG. 8 is a perspective view illustrating an outdoor display apparatus including two display modules according to another embodiment.

In the example described above, although three of the display modules 101 are provided, this is only an example. For example, according to other embodiments shown in FIGS. 7 and 8, the display unit 10 may include one or two of the display modules 101. Also, in the examples described above, the display modules 101 are arranged in the left-right direction, but the present disclosure is not limited thereto. The display modules 101 may be arranged horizontally (i.e., vertically with respect to each other).

Figure 5:
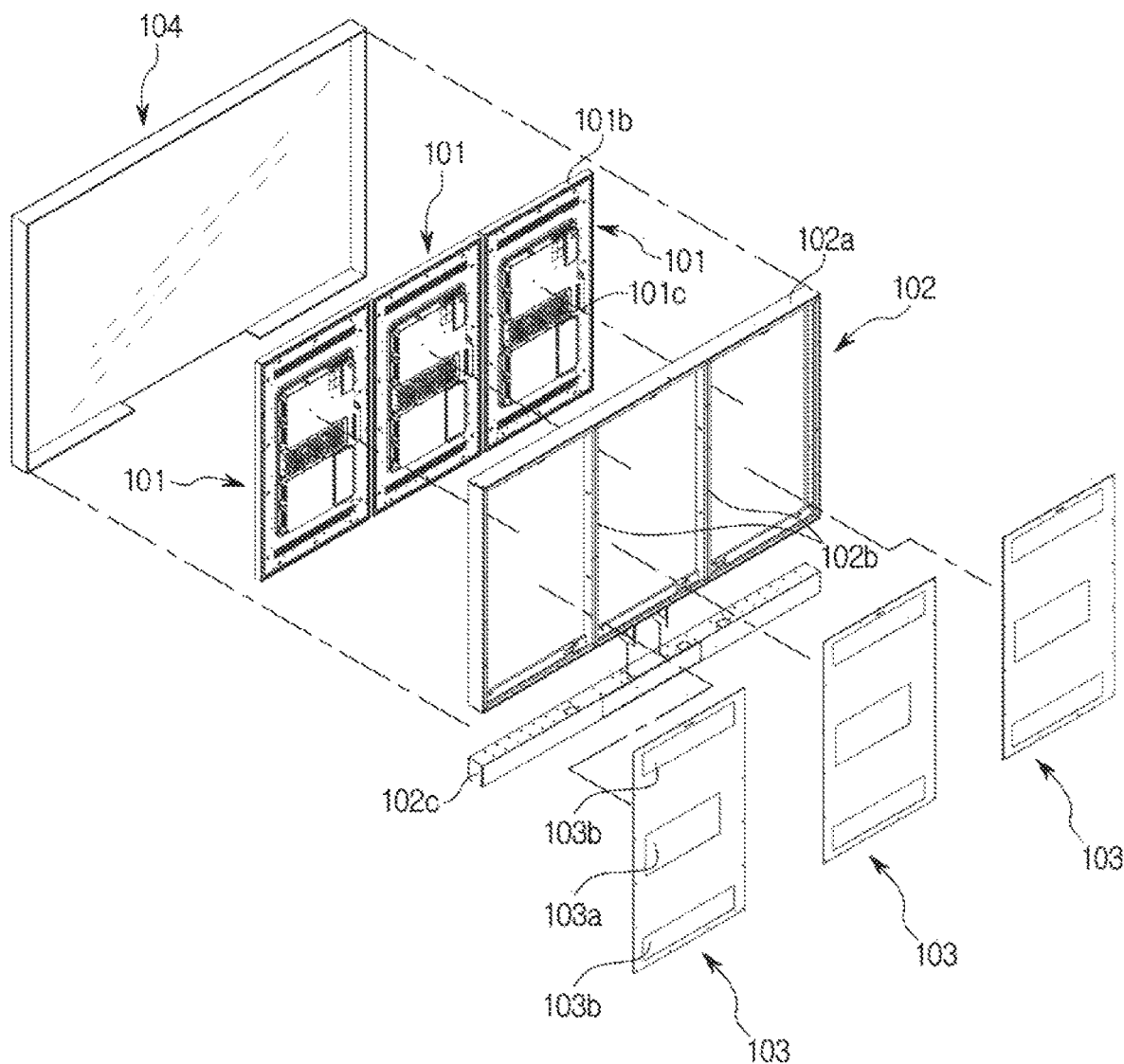
FIG. 5 is a rear exploded perspective view illustrating the display unit according to an embodiment.

Referring to FIGS. 5 and 6, the frame 102 includes a frame part 102a formed in a square shape, and support parts 102b disposed in an inner space of the frame part 102a to support the display modules 101, and a guide part 102c formed in a square tube shape and coupled to a lower side of the frame part 102a.

The frame part 102a accommodates the display modules 101 on the inside of the frame part 102a to form the upper, lower, left and right sides of the display unit 10. The support parts 102b are formed in a bar shape extending vertically and are spaced apart from each other inside the frame part 102a.

The display modules 101 are installed in a space formed by the frame part 102a and the support part 102b, respectively. As described above, since three of the display modules 101 are installed in the frame 102, the inner space of the frame part 102a is partitioned into three spaces by the two of the support parts 102b.

Figure 9:
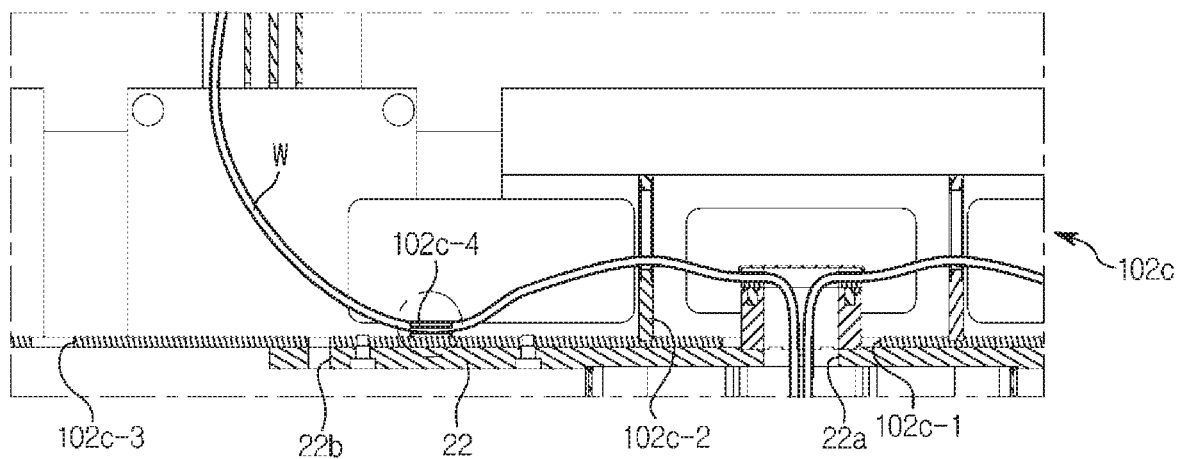
FIG. 9 is a partial sectional view illustrating a guide part and a shaft pipe in the outdoor display apparatus according to an embodiment.

The guide part 102c is formed in a rectangular tube shape. As illustrated in FIG. 9, the guide part 102c serves to guide various wires (W) connected to the display module 101 to be connected to various devices accommodated in the stand 20, and serves to guide any water flowed in the frame 102 to be discharged to the outside of the outdoor display apparatus 1.

Referring to FIG. 9, the guide part 102c includes a shaft mounting hole 102c-1 provided at a center of a lower surface of the guide part 102c on which a shaft pipe 22c of a mount part 22 is mounted, water inflow prevention thresholds 102c-2 provided on both sides of the shaft mounting hole 102c-1 to prevent water from flowing into the shaft mounting hole 102c-1, and drain holes 102c-3 provided outside the water inflow prevention thresholds 102c-2 to allow the water to be discharged to a lower side of the guide part 102c. The water inflow prevention threshold 102c-2 protrudes upward from an inner bottom surface of the guide part 102c.

Figure 10:
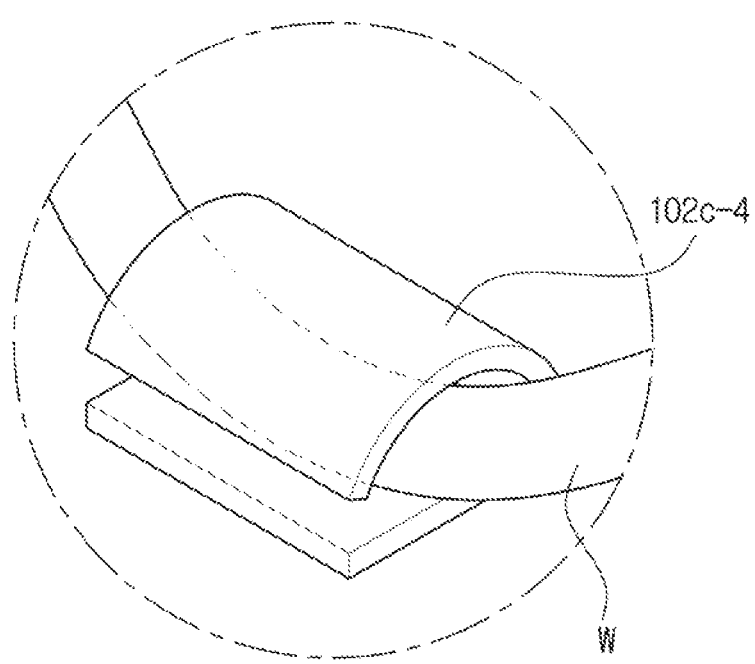
FIG. 10 is a perspective view illustrating a wire holder applied to the outdoor display apparatus according to an embodiment.

As shown in FIG. 10, a portion of a wire W is supported by a wire holder 102c-4 which is installed outside the water inflow prevention threshold 102c-2. The wire holder 102c-4 places the portion of the wire W below the water inflow prevention threshold 102c-2 to prevent water from flowing over the water inflow prevention threshold 102c-2 along the wire W.

As shown in FIG. 5, three of the rear covers 103 corresponding to the three display modules 101 are provided, and are fixed to the frame 102 to cover the rear surfaces of the three display modules 101, respectively. Therefore, the rear sides of the display modules 101 may be individually opened and closed by the rear covers 103.

The rear cover 103 includes a suction area 103a including a plurality of through holes provided at a center portion of the rear cover 103 to allow outside air to be suctioned into the display module 101, and a discharge area 103b including a plurality of through holes provided at upper and lower portions of the rear cover 103 to allow the air passing through the display module 101 to be discharged to the outside of the display module 101. The suction area 103a is provided at the position corresponding to the blowing fan 101c.

In the example described above, three of the rear covers 103 are provided to individually open and close the rear surfaces of the three display modules 101. However, this is only an example, and one of the rear covers 103 may open and close all the rear surfaces of a plurality of the display modules 101.

Since the stand 20 accommodates the various devices connected to the display module 101, the stand 20 includes a waterproof structure to prevent an inflow of water into the stand 20.

Figure 11:
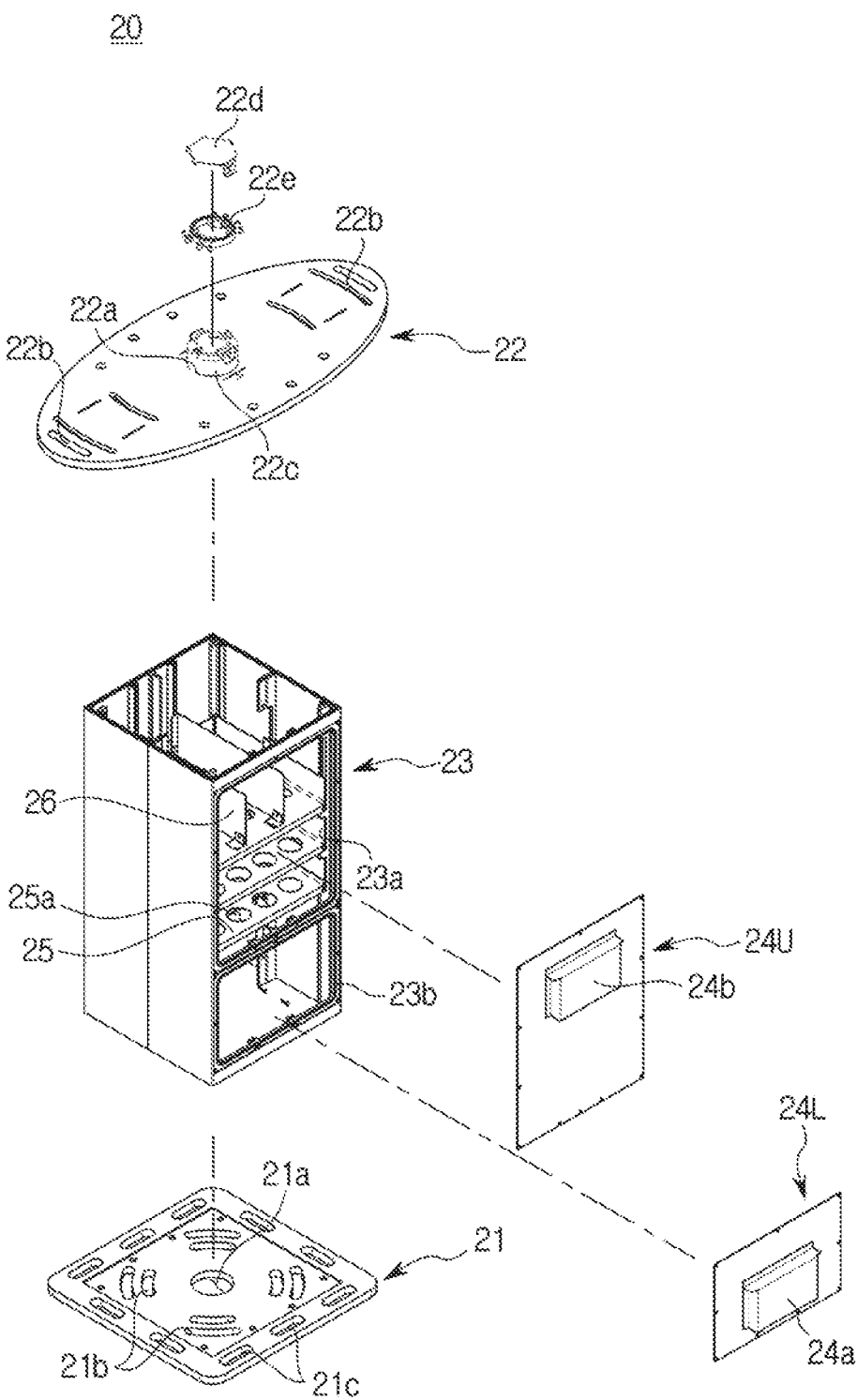
FIG. 11 is a rear exploded perspective view illustrating the stand applied to the outdoor display apparatus according to an embodiment.

Referring to FIGS. 3 and 11, the stand 20 includes a base part 21 to be fixed to the floor of the outdoor space, the mount part 22 on which the display unit 10 is mounted, the mount part 22 installed between the base part 21, and an accommodating part 23 installed between the base part 21 and the mount part 22 to accommodate the various devices connected to the display modules 101.

The base part 21 is formed in a rectangular plate and has a wire hole 21a through which the wire W passes and fixing holes 21b and 21c for fixing the base part 21 to the floor through a fastening member such as a bolt.

The wire hole 21a is provided in a circular shape at a center of the base part 21, and the fixing holes 21b and 21c include the first fixing holes 21b formed in an arc shape extending in the circumferential direction about the wire hole 21a, and the second fixing holes 21c formed in a straight line extending along an outer periphery of the base part 21.

The first fixing holes 21b are positioned inside the accommodating part 23 and the second fixing holes 21c are positioned outside the accommodating part 23. Therefore, the bolt may be fastened only to the first fixing holes 21b in consideration of an appearance of the outdoor display apparatus 1, and the bolt may be fastened not only to the first fixing holes 21b, but also to the second fixing holes 21c in consideration of a stable installation of the outdoor display apparatus 1. Also, the bolt may be fastened only to the second fixing holes 21c in consideration of installation convenience.

The mount part 22 is formed in an approximately oval shape. The mount part 22 includes a wire through hole 22a provided at a center of the mount part 22 through which the wire W passes, and fastening holes 22b to allow the frame 102 of the display unit 10 to be fixed to the mount part 22 through a fastening member such as a bolt.

The fastening holes 22b are symmetrically provided on opposite sides of the mount part 22 around the wire through hole 22a and the shaft pipe 22c to be described later. The fastening holes 22b are formed in an arc shape extending in a circumferential direction. The fastening holes 22b are formed spaced apart from each other in a longitudinal direction of the mount part 22.

Figure 12:
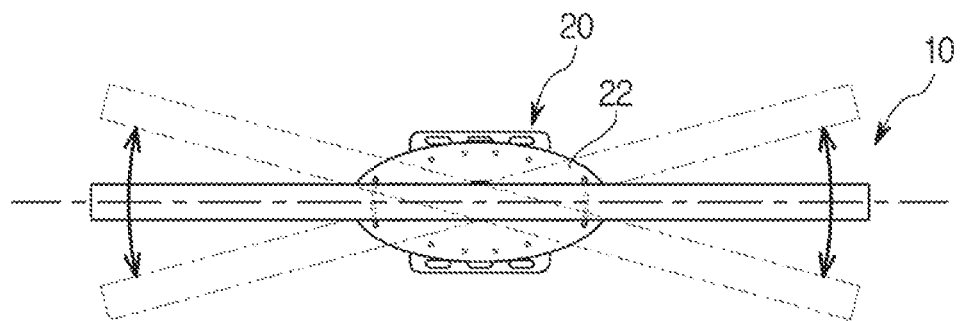
FIG. 12 is a plan view illustrating the outdoor display apparatus according to an embodiment.

As described above, since the fastening holes 22b are formed in the arc shape, the display unit 10 may be rotated about the stand 20 within a predetermined angle and then fixed. In this embodiment, as shown in FIG. 12, the fastening holes 22b extend at an angle of about 15 degrees so that an installation angle of the display unit 10 may be adjusted within 15 degrees.

Since the floor of the outdoor space is often formed of a very hard material such as concrete, it is very difficult to change the position of the stand 20 after fixing the stand 20 once to the floor of the outdoor space through a bolt or the like.

However, since the display unit 10 may be fixed after being rotated within the predetermined degrees, the installation angle of the display unit 10 may be finely adjusted even when the stand 20 is fixed to the floor.

Figure 13:
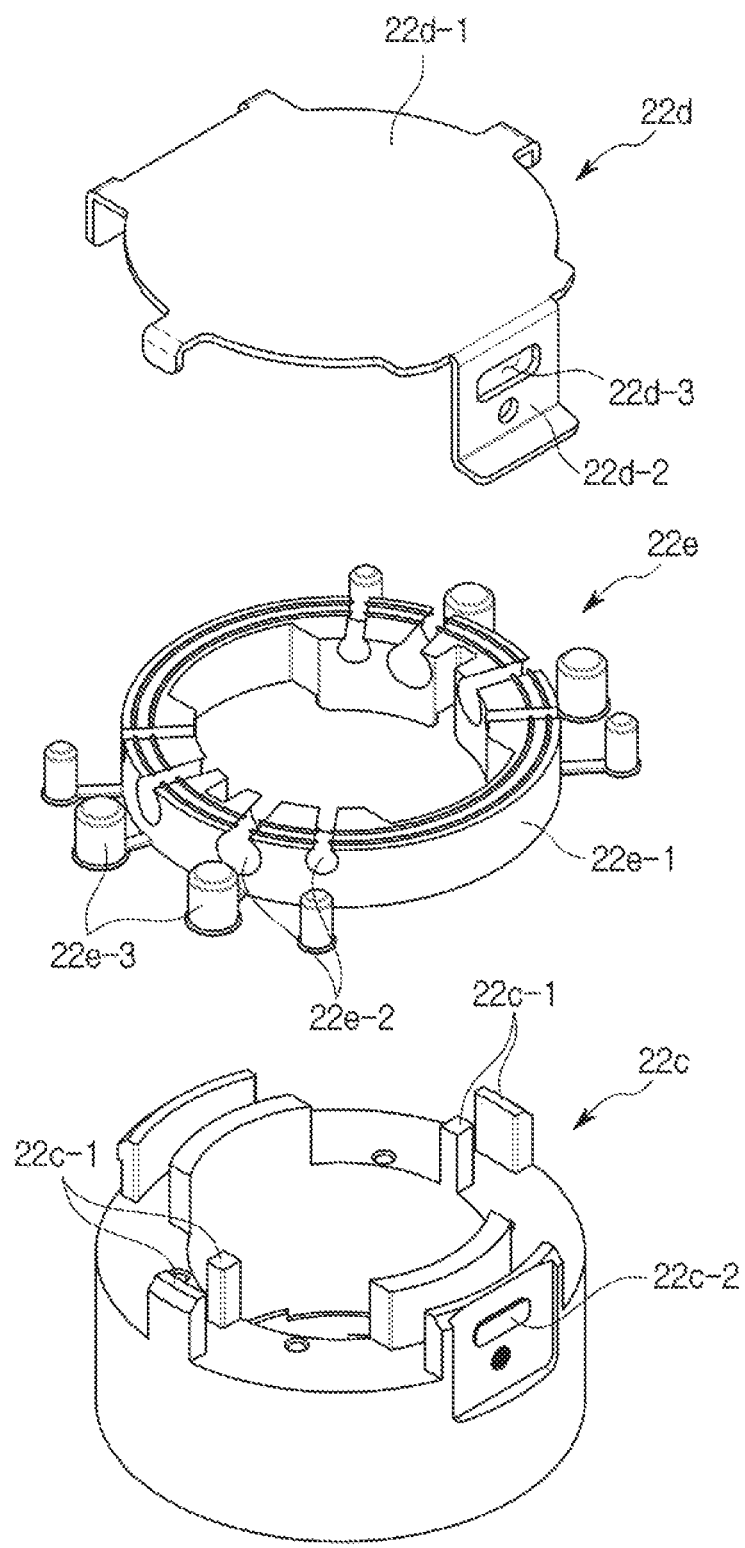
FIG. 13 is an exploded perspective view illustrating the shaft pipe, a cap and a sealing member applied to the outdoor display apparatus according to an embodiment.

Referring to FIG. 13, the stand 20 has the waterproof structure to prevent the inflow of water through the wire through hole 22a. The waterproof structure includes the shaft pipe 22c which is installed in the wire through hole 22a and in which the frame 102 is rotatably installed, a cap 22d which is installed on an upper end of the shaft pipe 22c to close the upper end of the shaft pipe 22c, and a sealing member 22e for sealing between the upper end of the shaft pipe 22c and the cap 22d.

Therefore, since any inflow of water into the accommodating part 23 of the stand through the wire through hole 22a is prevented by the cap 22d and the sealing member 22e, the stand 20 is waterproofed.

The shaft pipe 22c is formed in a hollow pipe shape and installed in the shaft mounting hole 102c-1 of the guide part 102c.

Therefore, the frame 102 is rotatably mounted to the mount part 22 through the shaft mounting hole 102c-1 and the shaft pipe 22c. The wires W connected to the display modules 101 are passed through the shaft pipe 22c and the wire through hole 22a and are connected to the various devices accommodated in the accommodating part 23.

The cap 22d is formed in a circular plate shaped and blocks the upper end of the shaft pipe 22c to prevent any water flowed in the frame 102 from being transferred to the inside of the stand 20 through the shaft pipe 22c.

The sealing member 22e is formed of an elastically deformable material such as rubber. The sealing member 22e is formed in a circular ring shape corresponding to the shaft pipe 22c. The sealing member 22e has a sealing portion 22e-1 for sealing between the upper end of the shaft pipe 22c and the cap 22d, a plurality of wire installation grooves 22e-2 provided on an upper surface of the sealing portion 22e-1 through which the wire W is installed, and a stopper portion 22e-3 extending radially outward from the sealing portion 22e-1 to block the unused wire installation groove 22e-2 of the wire installation grooves 22e-2. The wire installation groove 22e-2 is formed of grooves having various diameters so as to correspond to the wires W of various sizes.

The shaft pipe 22c includes a plurality of support ribs 22c-1 protruding from the upper end of the shaft pipe 22c to support the sealing portion 22e-1, and a plurality of latching protrusions 22c-2 inserted in a latching hole 22d-3 of the cap 22d.

The latching protrusions 22c-2 protrude radially outward from an outer surface of the support ribs 22c-1.

A pair of the support ribs 22c-1 are spaced apart from each other in a radial direction, and the sealing portion 22e-1 is inserted between the pair of support ribs 22c-1. A plurality of the pairs of the support ribs 22c-1 are spaced apart from each other in a circumferential direction of the shaft pipe 22c.

The cap 22d includes a cap portion 22d-1 to close the upper end of the shaft pipe 22c, and latching portions 22d-2 extending downward from the cap portion 22d-1 and provided with the latching hole 22d-3 that latches on the latching protrusions 22c-2, respectively.

As described above, since the sealing member 22e is formed of an elastically deformable material, when the wires W are installed in the wire installation groove 22e-2 of the sealing member 22e, an inner surface of the wire installation groove 22e-2 and an outer surface of the wires W are in close contact with each other. Therefore water may be prevented from passing between the inner surface of the wire installation groove 22e-2 and the outer surface of the wire W. In addition, the unused wire installation groove 22e-2 of the plurality of wire installation grooves 22e-2 is blocked by the stopper portion 22e-3. Therefore, water may be prevented from passing through the unused wire installation groove 22e-2.

In addition, when the sealing member 22e is installed on the upper end of the shaft pipe 22c and then the cap 22d is installed on the upper end of the shaft pipe 22c with the sealing member 22e interposed therebetween, the upper surface of the sealing portion 22e-1 of the sealing member 22e and a lower surface of the cap 22d are in close contact with each other. Therefore, water may be prevented from passing between the upper surface of the sealing portion 22e-1 and a lower surface of the cap 22d.

Accordingly, the wires W connected to the display module 101 through the shaft pipe 22c may be connected to the devices accommodated in the stand 20, while preventing the water flowed into the frame 102 from being transferred to the stand 20.

In the example described above, the mount part 22 is formed in an oval shape so that the display unit 10 may be rotated within predetermined degrees (15 degrees in this embodiment) before being fixed at a desired position, but is not limited thereto. That is, the mount part 22 may be formed of a circular plate, a square plate, or a rectangular plate in consideration of the installation environment of the outdoor display apparatus 1.

Referring to FIG. 11, the accommodating part 23 is formed in a substantially rectangular parallelepiped shape. The base part 21 is installed at a lower end of the accommodating part 23 to close a lower side of the accommodating part 23, and the mount portion 22 is installed on an upper end of the accommodating part 23 to close an upper side of the accommodating part 23.

The accommodating part 23 accommodates the devices such as a media player for playing sounds and images, a router for connecting to the Internet, a distributor for distributing image signals to a plurality of the display modules 101, a junction box for power connection, and the like.

The accommodating part 23 includes openings 23a and 23b provided on a rear surface of the accommodating part 23, and cover plates 24U and 24L for opening and closing the openings 23a and 23b. The space between the openings 23a and 23b and the cover plates 23a and 23b is sealed with rubber or silicone to prevent water from flowing into the accommodating part 23 through the openings 23a and 23b.

The openings 23a and 23b include the upper opening 23a provided at an upper portion of the rear surface of the accommodating part 23 and the lower opening 23b provided at a lower portion of the rear surface of the accommodating part 23. The cover plates 24U and 24L includes the upper cover plate 24U for closing the upper opening 23a and the lower cover plate 24L for closing the lower opening 23b.

The media player, the router and the distributor may be disposed inside the upper opening 23a in the accommodating part 23, and the junction box may be disposed inside the lower opening 23b.

The lower cover plate 24L includes a suction guide 24a for allowing air outside of the accommodating part 23 to be suctioned into the accommodating part 23, and the upper cover plate 24U includes a discharge guide 24b for allowing air inside the accommodating part 23 to be discharged to the outside of the accommodating part 23.

The suction guide 24a protrudes rearward from the lower cover plate 24L and the discharge guide 24b protrudes rearward from the upper cover plate 24U. The suction guide 24a and the discharge guide 24b are each formed as a long rectangular parallelepiped-shaped duct. Lower surfaces of the suction guide 24a and the discharge guide 24b are opened to allow air to pass therethrough but prevent rainwater or the like from being flowed into the inside of the suction guide 24a and the discharge guide 24b.

Figure 14:
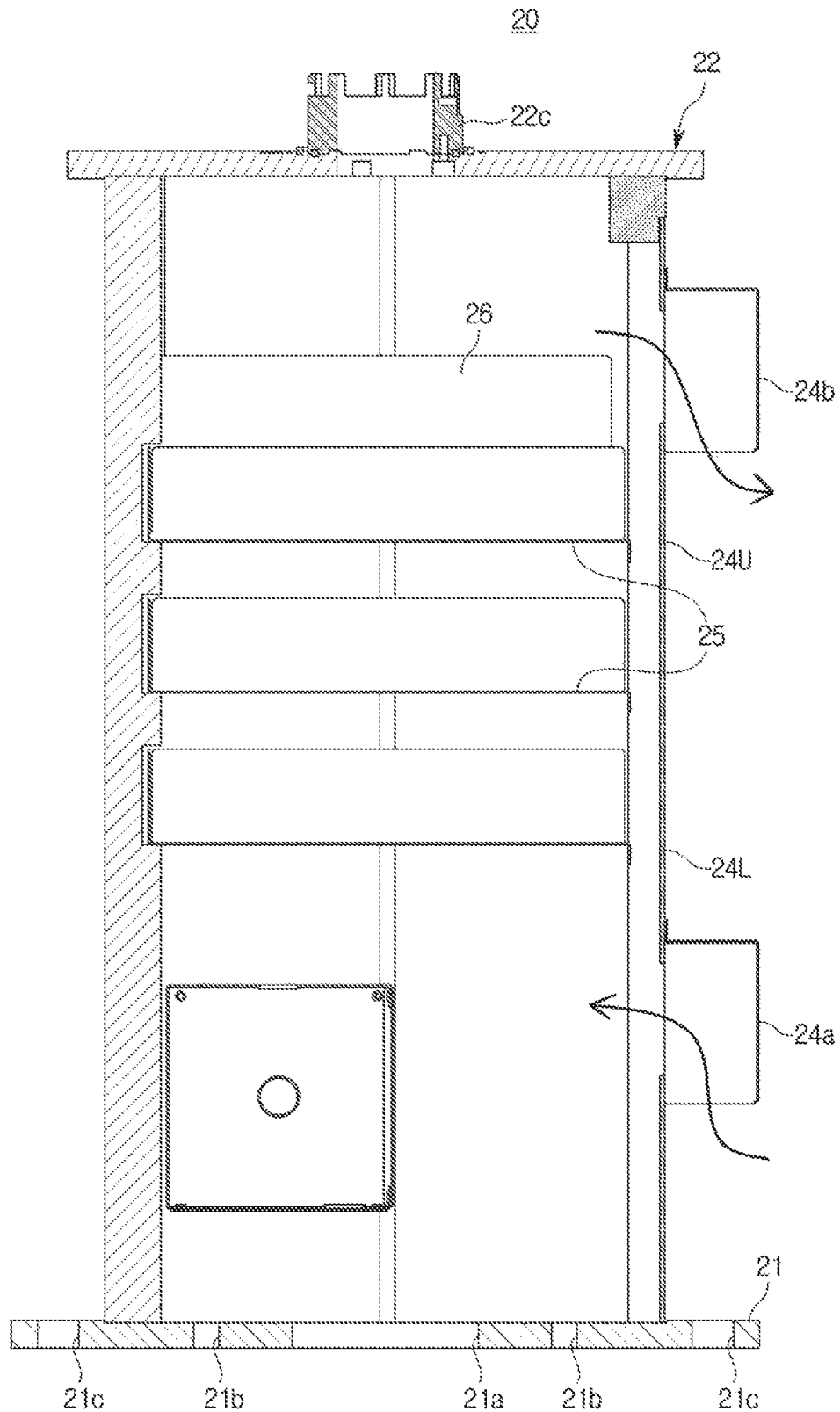
FIG. 14 is a side sectional view illustrating the stand applied to the outdoor display apparatus according to an embodiment.

Accordingly, as shown in FIG. 14, when heat is generated in the devices installed in the accommodating part 23, by the convection phenomenon, heat generated in the accommodating part 23 is discharged together with the inside air through the discharge guide 24b and the outside air at a low temperature flows into the accommodating part 23 through the suction guide 24a to cool the devices by absorbing the heat generated by the devices.

Referring to FIG. 11, the accommodating part 23 includes a plurality of shelves 25 for vertically dividing an inner space of the accommodating part 23, and a plurality of partitions 26 for partitioning the inner space to the left and right. The shelves 25 are provided with communication holes 25a through which the air may pass through the shelves 25. The various devices are respectively installed in spaces partitioned by the shelves 25 and the partitions 26.

In the example described above, the openings 23a and 23b and the cover plates 24U and 24L are provided on the rear surface of the stand 20, but this is only an example. That is, the opening and the cover may be provided on one of sides of the stand or on the front of the stand in consideration of the installation environment of the outdoor display apparatus 1.

In the example described above, the openings 23*a* and 23*b* and the cover plates 24U and 24L are provided on the rear surface of the stand 20, but this is only an example. That is, the opening and the cover may be provided on both side of the stand or on the front of the stand in consideration of the installation environment of the outdoor display apparatus 1.

In the example described above, the openings 23*a* and 23*b* include the upper opening 23*a* and the lower opening 23*b* arranged vertically, and the cover plates 24U and 24L include the upper cover plate 24U and the lower cover plate 24L, but this is only an example. The stand may include one opening and one cover, or include three or more openings and covers. Also, the stand may include a plurality of the openings and a plurality of the covers arranged laterally.

Figure 15:
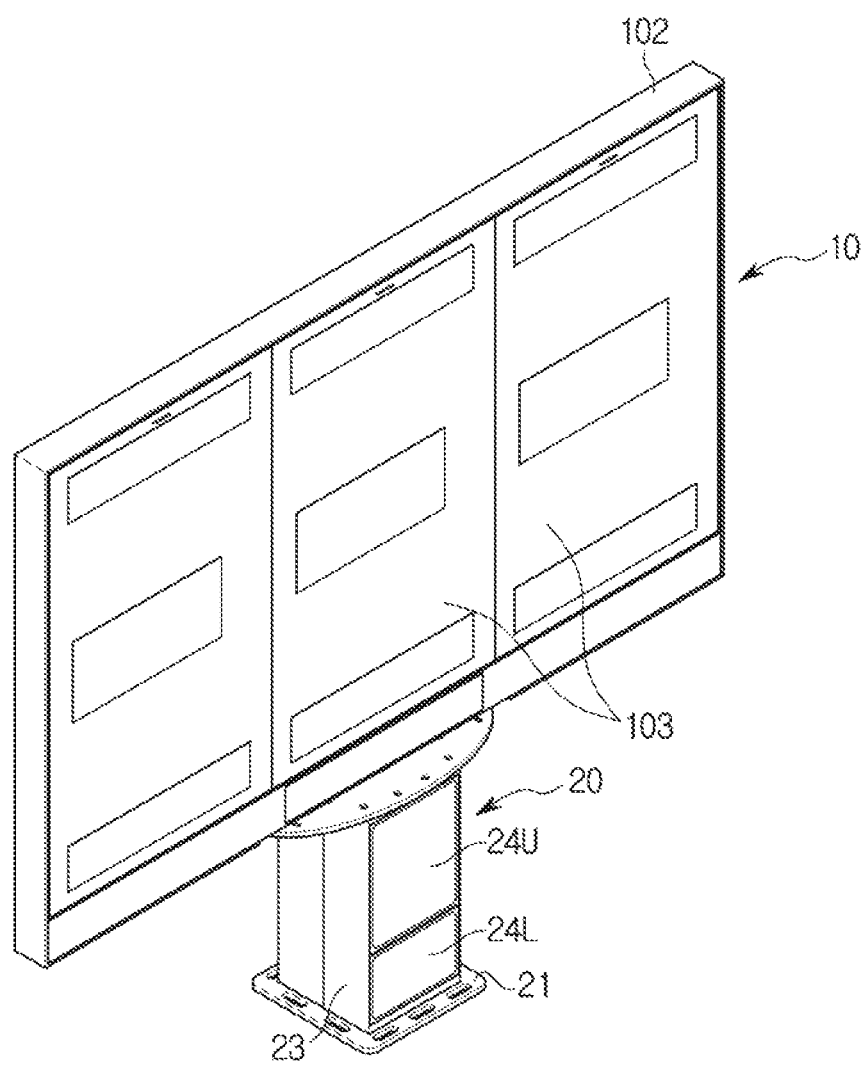
FIG. 15 is a rear perspective view illustrating an outdoor display apparatus according to another embodiment.

In the example described above, considering a case where a large amount of heat is generated in the stand 20 more than a predetermined amount, the suction guide 24*a* is provided on the upper cover plate 24U and the discharge guide 24*b* is provided on the lower cover plate 24L. That is, when the amount of heat generated in the stand 20 is smaller than the predetermined amount, as shown in FIG. 15, the suction guide and the discharge guide may not be formed in the upper cover 23U and the lower cover 23L of the stand 20.

In the example described above, the accommodating part 23 is formed in a vertically long rectangular parallelepiped shape, but the shape of the accommodating part 23 is not limited thereto. The accommodating part 23 may be formed in a columnar shape or an oval shape like the mount part 22.

As described above, the outdoor display apparatus 1 may be manufactured and packaged such that the stand 20 and the display unit 10 are separated from each other, so that the outdoor display apparatus 1 can be carried and installed by manpower.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. An outdoor display apparatus comprising:
   a display unit configured to accommodate at least one display module to be mounted therein; and
   a stand configured to accommodate at least one device, which is connectable to the at least one display module, to be mounted therein, the display unit being configured to be rotatably installed at an upper side of the stand,
   wherein the stand comprises a base part configured to be installed on a floor, a mount part provided on the upper side of the stand, and an accommodating part provided between the base part and the mount part and configured to accommodate the at least one device,
   wherein the mount part comprises a wire through hole configured to allow a wire connected to the at least one display module to pass therethrough, and a waterproof structure configured to prevent an inflow of water through the wire through hole, and
   wherein the waterproof structure comprises a shift pipe installed in the wired through hole, a cap configured to cover an upper end of the shaft pipe, and a sealing member configured to form a seal between the upper end of the shaft pipe and the cap.

2. The outdoor display apparatus according to wherein the sealing member comprises a sealing portion having a circular ring shape which corresponds to the shaft pipe, and a plurality of wire installation grooves recessed on an upper surface of the sealing portion and configured to accommodate the wire.

3. The outdoor display apparatus according to claim 2, wherein the sealing member further comprises stopper portions extending from the sealing portion and configured to close unused wire installation grooves of the plurality of wire installation grooves.

4. The outdoor display apparatus according to claim 2, wherein the shaft pipe comprises a plurality of support ribs protruding from the upper end of the shaft pipe and configured to support the sealing portion,
   wherein the plurality of support ribs includes at least one pair of support ribs, support ribs of each of the at least one pair of support ribs being spaced apart from each other in a radial direction, and
   wherein the sealing portion is inserted between the support ribs of each of the at least one pair of support ribs.

5. The outdoor display apparatus according to claim 2, wherein the shaft pipe comprises a plurality of latching protrusions,
   wherein the cap comprises a cap portion configured to cover the upper end of the shaft pipe and a plurality of latching portions extending downward from the cap portion, and
   wherein the plurality of the latching portions include latching holes configured to latch the plurality of the latching protrusions.

6. The outdoor display apparatus according to claim 1, wherein the display unit has a rectangular shape and comprises a frame configured to accommodate the at least one display module and a rear cover configured to cover a rear surface of the at least one display module.

7. The outdoor display apparatus according to claim 6, wherein the frame comprises a frame part having the rectangular shape and a support part extending vertically to partition the inside of the frame part and configured to support the at least one display module.

8. The outdoor display apparatus according to claim 1, wherein the mount part has an oval shape, and
   wherein the display unit is configured to be rotatably mounted on the mount part through the shaft pipe.

9. The outdoor display apparatus according to claim 8, wherein the mount part further comprises fastening holes configured to accommodate fasteners to install the display unit thereon, and
   wherein the fastening holes have an arc shape extending in a circumferential direction about the wire through hole.

10. The outdoor display apparatus according to claim 8, wherein the accommodating part comprises an opening provided at one side of the accommodating part and a cover plate configured to open and close the opening.

11. The outdoor display apparatus according to claim 10, wherein the opening comprises upper and lower openings provided at upper and lower portions of the accommodating part, and
    wherein the cover plate comprises an upper cover plate configured to open and close the upper opening and a lower cover plate configured to open and close the lower opening.

12. The outdoor display apparatus according to claim 11, wherein the lower cover plate comprises a suction guide configured to guide an inflow of air, and wherein the upper cover plate comprises a discharge guide configured to guide a discharge of air.

13. The outdoor display apparatus according to claim 1, further comprising a cover configured to be coupled to a front side of the display unit to cover at least a front surface of the at least one display module.

14. An outdoor display apparatus comprising:
a display unit configured to accommodate a plurality of display modules to be mounted therein; and
a stand configured to accommodate at least one device, which is connectable to the plurality of display modules, to be mounted therein,
wherein the display unit is configured to be fixed to the stand such that the display unit may be rotated within a predetermined angle with respect to the stand,
wherein the stand comprises a mounting part, and
wherein the mounting part comprises a waterproof structure comprising a shaft pipe installed in the wired through hole, a cap configured to cover an upper end of the shaft pipe, and a sealing member configured to form a seal between the upper end of the shaft pipe and the cap.

15. The outdoor display apparatus according to claim 14, wherein the stand comprises a shaft pipe having a hollow pipe shape,
wherein the display unit is configured to be rotatably installed on the shaft pipe, and
wherein a wire, connecting at least one of the plurality of display modules and the at least one device accommodated in the stand, passes through the shaft pipe.

16. The outdoor display apparatus according to claim 15, wherein the stand comprises a mount part comprising an oval plate,
wherein the display unit being configured to be installed on an upper side of the stand, and
wherein the shaft pipe is disposed at a center of the mount part.

17. The outdoor display apparatus according to claim 16, wherein the mount part comprises a plurality of fastening holes through which the display unit is fixed to the mount part by at least one fastening member, and
wherein the plurality of the fastening holes have an arc shape extending in a circumferential direction about the shaft pipe.

18. A display apparatus comprising:
a display housing configured to accommodate at least one display module to be provided therein; and
a stand configured to support the display housing through a rotatable connection,
wherein the stand comprises a base part provided at a lower end of the stand, a mount part provided at an upper end of the stand opposite to the lower end, and an accommodating part provided in a middle portion of the stand between the lower end and the upper end,
wherein the base part is configured to be provided on a floor, and the accommodating part is a hollow portion configured to accommodate at least one electronic device,
wherein the rotatable connection is formed between the display housing and the mount part, and
wherein the mount part comprises a waterproof structure comprising a shaft pipe installed in the wire through hole, a cap configured to cover an upper end of the shaft pipe, and a sealing member configured to form a seal between the upper end of the shaft pipe and the cap.

* * * * *